(12) United States Patent
Kappel (10) Patent No.: US 12,272,161 B2
(45) Date of Patent: Apr. 8, 2025

(54) SYSTEM AND METHOD FOR PROCESSING BIOLOGY-RELATED DATA AND A MICROSCOPE

(71) Applicant: Leica Microsystems CMS GmbH, Wetzlar (DE)

(72) Inventor: Constantin Kappel, Schriesheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 425 days.

(21) Appl. No.: 17/596,279

(22) PCT Filed: Jun. 7, 2019

(86) PCT No.: PCT/EP2019/064971
§ 371 (c)(1),
(2) Date: Dec. 7, 2021

(87) PCT Pub. No.: WO2020/244776
PCT Pub. Date: Dec. 10, 2020

(65) Prior Publication Data
US 2022/0254177 A1 Aug. 11, 2022

(51) Int. Cl.
*G06K 9/00* (2022.01)
*G06V 10/44* (2022.01)
(Continued)

(52) U.S. Cl.
CPC ............ *G06V 20/69* (2022.01); *G06V 10/454* (2022.01); *G06V 10/774* (2022.01); *G06V 10/82* (2022.01); *G06V 20/698* (2022.01)

(58) Field of Classification Search
CPC .... G06V 20/69; G06V 10/454; G06V 10/774; G06V 10/82; G06V 20/698; G06F 18/285
See application file for complete search history.

(56) References Cited

U.S. PATENT DOCUMENTS

| 6,789,069 B1 * | 9/2004 | Barnhill | G16B 40/00 706/45 |
| 10,049,450 B2 * | 8/2018 | Madabhushi | G06N 3/08 |

(Continued)

FOREIGN PATENT DOCUMENTS

| CN | 102663924 A | 9/2012 |
| CN | 109036571 A | 12/2018 |

(Continued)

OTHER PUBLICATIONS

Caleb Vununu et al. A Deep Feature Learning Scheme for Counting the Cells in Microscopy Data.
(Continued)

*Primary Examiner* — Shervin K Nakhjavan
(74) *Attorney, Agent, or Firm* — 2SPL Patent Attorneys PartG mbB; Kieran O'Leary (57) ABSTRACT

A system (100) comprising one or more processors (110) and one or more storage devices (120) is configured to obtain biology-related image-based input data (107) and generate a high-dimensional representation of the biology-related image-based input data (107) by a trained visual recognition machine-learning algorithm executed by the one or more processors (110). The high-dimensional representation comprises at least 3 entries each having a different value. Further, the system is configured to at least one of store the high-dimensional representation of the biology-related image-based input data (107) together with the biology-related image-based input data (107) by the one or more storage devices (120) or output biology-related language-based output data (109) corresponding to the high-dimensional representation.

24 Claims, 4 Drawing Sheets

(51) Int. Cl.
*G06V 10/774* (2022.01)
*G06V 10/82* (2022.01)
*G06V 20/69* (2022.01)

(56) References Cited

U.S. PATENT DOCUMENTS

| | | | | |
|---|---|---|---|---|
| 10,127,475 | B1* | 11/2018 | Corrado | G06F 18/214 |
| 10,146,914 | B1* | 12/2018 | Victors | G16B 40/00 |
| 10,496,884 | B1* | 12/2019 | Nguyen | G06V 30/1916 |
| 10,740,896 | B2 | 8/2020 | Georgescu | G16H 30/20 |
| 10,769,501 | B1* | 9/2020 | Ando | G06V 30/274 |
| 11,017,896 | B2* | 5/2021 | Madabhushi | G16H 30/40 |
| 11,087,864 | B2* | 8/2021 | Xie | H04L 67/104 |
| 11,301,961 | B2* | 4/2022 | Takeshima | G06T 5/00 |
| 11,636,399 | B2* | 4/2023 | Kajihara | G06N 7/00 706/12 |
| 11,901,077 | B2* | 2/2024 | Klaiman | G06T 7/44 |
| 2002/0111742 | A1* | 8/2002 | Rocke | G16B 40/00 702/22 |
| 2017/0249548 | A1 | 8/2017 | Nelson et al. | |
| 2018/0232400 | A1 | 8/2018 | Saavedra Rondo | |
| 2018/0232883 | A1* | 8/2018 | Sethi | G16H 30/40 |
| 2019/0065817 | A1* | 2/2019 | Mesmakhosroshahi | G06V 20/698 |
| 2019/0087532 | A1* | 3/2019 | Madabhushi | G06V 30/19173 |
| 2019/0183429 | A1* | 6/2019 | Sung | A61B 5/7267 |
| 2019/0251688 | A1* | 8/2019 | Madabhushi | G06F 18/24 |
| 2024/0054384 | A1* | 2/2024 | Catron | G06N 20/00 |

FOREIGN PATENT DOCUMENTS

| | | |
|---|---|---|
| JP | 2013-201909 A | 10/2013 |
| JP | 2016-517115 A | 6/2016 |
| JP | 2018-125019 A | 8/2018 |
| WO | 2018091486 A1 | 5/2018 |
| WO | WO-2019199392 A1 * | 10/2019 ........... G02B 21/367 |

OTHER PUBLICATIONS

Muramoto et al., Image Caption Generation Using Hint-Words, 2019, Journal of the Information Knowledge Society of Japan, 2019, vol. 29, No. 2, pp. 153-158.

Mendieta, Milton et al., "A Cross-Modal transfer approach for histological images: A case study in aquaculture for disease identification using Zero-Shot learning", IEEE Second Ecuador Technical Chapters Meeting(ETCM), pp. 1-6, published on Oct. 16, 2017.

* cited by examiner

SYSTEM AND METHOD FOR PROCESSING BIOLOGY-RELATED DATA AND A MICROSCOPE

TECHNICAL FIELD

Examples relate to the processing of biology-related data.

BACKGROUND

In many biological applications, a vast amount of data is generated. For example, images are taken from a huge amount of biological structures and stored in databases. It is very time-consuming and expensive to analyze the biological data manually.

SUMMARY

Hence, there is a need for an improved concept for processing biology-related data.

This need may be satisfied by the subject matter of the claims.

Some embodiments relate to a system comprising one or more processors coupled to one or more storage devices. The system is configured to obtain biology-related image-based input data and generate a high-dimensional representation of the biology-related image-based input data by a trained visual recognition machine-learning algorithm executed by the one or more processors. The high-dimensional representation comprises at least 3 entries each having a different value. Further, the system is configured to store the high-dimensional representation of the biology-related image-based input data together with the biology-related image-based input data by the one or more storage devices and/or output biology-related language-based output data corresponding to the high-dimensional representation.

By using a visual recognition machine-learning algorithm images can be mapped to high-dimensional representations. By allowing the high-dimensional representation to have entries with various different values (in contrast to one hot encoded representations), images with semantically similar content can be mapped to similar high-dimensional representations. These high-dimensional representations can be stored or output as annotations or tags of the images and/or these high-dimensional representations may be mapped to textual information, which describes the content of the images. In this way, images in an existing database and/or images of a running experiment may be annotated or tagged, even if the images were not labeled before. If images in a database or of a running experiment are tagged by the corresponding high-dimensional representations, these images may be searchable by a text-to-images search (e.g. a textual search term is input and one or more corresponding images stored in the database are output) or an image-to-image search (e.g. a search image is input and one or more similar images stored in the database are output).

SHORT DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
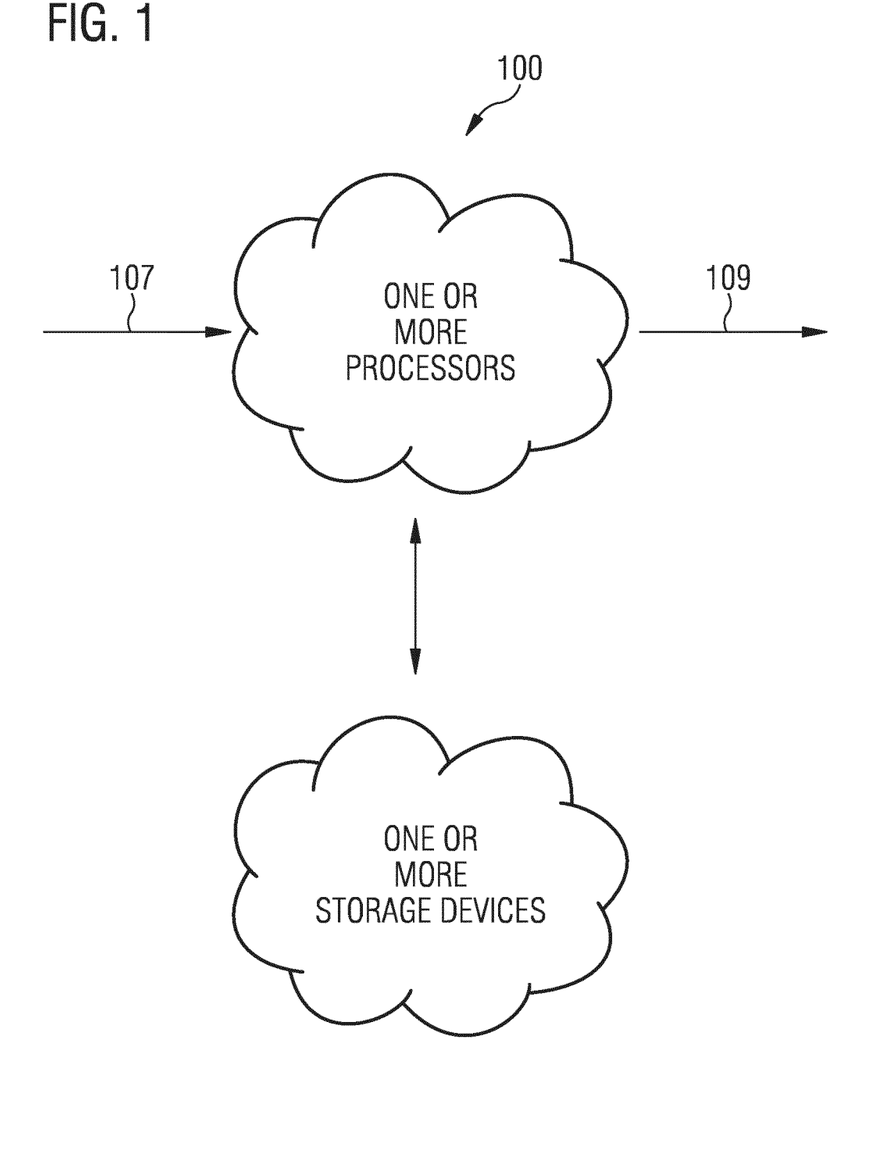
FIG. 1 is a schematic illustration of a system for processing biology-related image-based input data.

FIG. 1 shows a schematic illustration of a system for processing biology-related image-based input data according to an embodiment. The system 100 comprising one or more processors 110 coupled to one or more storage devices 120. The system 100 is configured to obtain (first) biology-related image-based input data 107 and generate a (first) high-dimensional representation of the biology-related image-based input data 107 by a (first) trained visual recognition machine-learning algorithm executed by the one or more processors 110. The high-dimensional representation comprises at least 3 entries each having a different value (or at least 20 entries, at least 50 entries or at least 100 entries having values different from each other). Further, the system 100 is configured to store the high-dimensional representation of the biology-related image-based input data 107 together with the biology-related image-based input data 107 by the one or more storage devices 120 and/or output and/or store (first) biology-related language-based output data 109 corresponding to the high-dimensional representation.

The biology-related image-based input data 107 may be image data (e.g. pixel data of an image) of an image of a biological structure comprising a nucleotide or a nucleotide sequence, a biological structure comprising a protein or a protein sequence, a biological molecule, a biological tissue, a biological structure with a specific behavior, and/or a biological structure with a specific biological function or a specific biological activity. The biological structure may be a molecule, a viroid or virus, artificial or natural membrane enclosed vesicles, a subcellular structure (like a cell organelle) a cell, a spheroid, an organoid, a three-dimensional cell culture, a biological tissue, an organ slice or part of an organ in vivo or in vitro. For example, the image of the biological structure may be an image of the location of a protein within a cell or tissue or an image of a cell or tissue with endogenous nucleotides (e.g. DNA) to which labeled nucleotide probes bind (e.g. in situ hybridization). The image data may comprise a pixel value for each pixel of an image for each color dimension of the image (e.g. three color dimensions for RGB representation). For example, depending on the imaging modality other channels may apply related to excitation or emission wavelength, fluorescence lifetime, light polarization, stage position in three spatial dimensions, different imaging angles. The biology-related image-based input data set may be an XY pixel map, volumetric data (XYZ), time series data (XY+T) or combinations thereof (XYZT). Moreover, additional dimensions depending on the kind of image source may be included such as channel (e.g. spectral emission bands), excitation wavelength, stage position, logical position as in a multi-well plate or multi-positioning experiment and/or mirror and/or objective position as in lightsheet imaging. For example, the biology-related image-based input data 107 may be obtained from a database (e.g. stored by the one or more storage devices) or may be obtained by an imaging device (e.g. microscope, camera) during a running experiment. For example, the system 100 may comprise a microscope configured to obtain the biology-related image-based input data 107 by taking an image of a biological specimen.

The high-dimensional representation may be a hidden representation, a latent vector, an embedding, a sematic embedding and/or a token embedding and/or may be also called hidden representation, a latent vector, an embedding, a semantic embedding and/or a token embedding.

The high-dimensional representation may be a numerical representation (e.g. comprising numerical values only). The high-dimensional representation may comprise more than 100 dimensions (or more than 300 dimensions or more than 500 dimensions) and/or less than 10000 dimensions (or less than 3000 dimensions or less than 1000 dimensions). Each entry of the high-dimensional representation may be a dimension of the high-dimensional representation (e.g. a high-dimensional representation with 100 dimensions comprises 100 entries). For example, using high dimensional representations with more than 300 dimensions and less than 1000 dimensions may enable a suitable representation for biology-related data with semantic correlation. The high-dimensional representation may be a vector. If a vector representation is used for the entries of the high-dimensional representation, an efficient comparison and/or other calculations (e.g. normalization) may be enabled, although other representations (e.g. as a matrix) may be possible as well. For example, the high-dimensional representation may be a normalized vector. The high-dimensional representations may be generated by a trained visual recognition machine-learning algorithm, which may have been trained by a loss function, which causes the trained visual recognition machine-learning algorithm to output normalized high-dimensional representations. However, other approaches for the normalization of the high-dimensional representation may be applicable as well.

For example, the high-dimensional representation may comprise various entries (at least three) with values unequal 0 in contrast to one hot encoded representations. By using a high-dimensional representation, which is allowed to have various entries with values unequal 0, information on a semantic relationship between the high-dimensional representations can be reproduced. For example, more than 50% (or more than 70% or more than 90%) of values of the entries of the high-dimensional representation may be unequal 0. Sometimes one hot encoded representations have also more than one entry unequal 0, but there is only one entry with high value and all other entries have values at noise level (e.g. lower than 10% of the one high value). In contrast, the values of more than 5 entries (or more than 20 entries or more than 50 entries) of the high-dimensional representation may be larger than 10% (or larger than 20% or larger than 30%) of a largest absolute value of the entries of the high-dimensional representation, for example. For example, each entry of the high-dimensional representation may comprise a value between −1 and 1.

The high-dimensional representation may be determined by applying at least a part (e.g. encoder) of the trained visual recognition machine-learning algorithm with a trained set of parameters to the biology-related image-based input data 107. For example, generating the high-dimensional representation by the trained visual recognition machine-learning algorithm may mean that the high-dimensional representation is generated by an encoder of the trained visual recognition machine-learning algorithm. The trained set of parameters of the trained visual recognition machine-learning algorithm may be obtained during training of the visual recognition machine-learning algorithm as described below.

The values of one or more entries of the high-dimensional representation may be proportional to a likelihood of a presence of a specific biological function or a specific biological activity. By using a mapping that generates high-dimensional representations preserving the semantical similarities of the input data sets, semantically similar high-dimensional representations may have a closer distance to each other than semantically less similar high-dimensional representations. Further, if two high-dimensional representations represent input data sets with same or similar specific biological function or specific biological activity one or more entries of these two high-dimensional representations may have same or similar values. Due to the preservation of the semantic, one or more entries of the high-dimensional representations may be an indication of an occurrence or presence of a specific biological function or a specific biological activity. For example, the higher a value of one or more entries of the high-dimensional representation, the higher the likelihood of a presence of a biological function or a biological activity correlated with these one or more entries may be.

The trained visual recognition machine-learning algorithm may also be called image recognition model or visual model. The trained visual recognition machine-learning algorithm may be or may comprise a trained visual recognition neural network. The trained visual recognition neural network may comprise more than 20 layers (or more than 40 layers or more than 80 layers) and/or less than 400 layers (or less than 200 layers or less than 150 layers). The trained visual recognition neural network may be a convolutional neural network or a capsule network. Using a convolutional neural network or a capsule network may provide a trained visual recognition machine-learning algorithm with high accuracy for biology-related image-based data. However, also other visual recognition algorithms may be applicable. For example, the trained visual recognition neural network may comprise a plurality of convolution layers and a plurality of pooling layers. However, pooling layers may be avoided, if a capsule network is used and/or stride=2 is used instead of stride=1 for the convolution, for example. The trained visual recognition neural network may use a rectified linear unit activation function. Using a rectified linear unit activation function may provide a trained visual recognition machine-learning algorithm with high accuracy for biology-related image-based input data, although other activation functions (e.g. a hard tanh activation function, a sigmoid activation function or a tanh activation function) may be applicable as well. For example, the trained visual recognition neural network may comprise a convolutional neural network and/or may be a ResNet or a DenseNet of a depth depending on the size of the input images.

The system 100 may store the high-dimensional representation of the biology-related image-based input data 107 in a database (e.g. stored by the one or more storage devices) together with the biology-related image-based input data 107. The database may store a plurality of images together with corresponding high-dimensional representations. The high-dimensional representation may be used as annotation, tag or label for the biology-related image-based input data 107. Images in the database may be searchable through the corresponding high-dimensional representations.

Additionally or alternatively, the system 100 may output biology-related language-based output data 109 corresponding to the high-dimensional representation to a user (e.g. by a display, screen) and/or to a storage device for storing the biology-related language-based output data 109 together with the biology-related image-based input data 107. The biology-related language-based output data 109 may be a textual output being related to a biological structure, a biological function, a biological behavior or a biological activity of the biological structure shown in the image, for which the high-dimensional representation was generated. For example, the biology-related language-based output data 109 may be a nucleotide sequence, a protein sequence, a description of a biological molecule or biological structure, a description of a behavior of a biological molecule or biological structure, and/or a description of a biological function or a biological activity. The textual output may be natural language, which is descriptive of the biological molecule (e.g. polysaccharide, poly/oligonucleotide, protein or lipid) or its behavior in the context of the experiment or data set. For example, the biology-related language-based output data 109 may be a nucleotide sequence, a protein sequence or a coarse-grained search term of a group of biological terms.

A group of biological terms may comprise a plurality of coarse-grained search terms (or alternatively called molecular biological subject heading terms) belonging to the same biological topic. A group of biological terms may be catalytic activity (e.g. as some sort of reaction equation using words for educts and products), pathway (e.g. which pathway is involved, for example, glycolysis), sites and/or regions (e.g. binding site, active site, nucleotide binding site), GO gene ontology (e.g. molecular function, for example, nicotinamide adenine dinucleotide NAD binding, microtubule binding), GO biological function (e.g. apoptosis, gluconeogenesis), enzyme and/or pathway databases (e.g. unique identifiers for sic function, for example, in BRENDA/EC number or UniPathways), subcellular localization (e.g. cytosol, nucleus, cytoskeleton), family and/or domains (e.g. binding sites, motifs, e.g. for posttranslational modification), open-reading frames, single-nucleotide polymorphisms, restriction sites (e.g. oligonucleotides recognized by a restriction enzyme) and/or biosynthesis pathway (e.g. biosynthesis of lipids, polysaccharides, nucleotides or proteins). For example, the group of biological terms may be the group of subcellular localizations and the coarse-grained search terms may be cytosol, nucleus and cytoskeleton.

The biology-related language-based output data 109 may be a textual information with respect to the content of the image, which corresponds to the high-dimensional representation. The biology-related language-based output data 109 may be determined based on the high-dimensional representation (e.g. by using a trained language recognition machine-learning algorithm). For example, the system 100 may be configured to determine the biology-related language-based output data 109 based on the high-dimensional representation by a decoder of a trained language recognition machine-learning algorithm executed by the one or more processors 110.

The trained language recognition machine-learning algorithm may also be called textual model, text model or language model. The language recognition machine-learning algorithm may be or may comprise a trained language recognition neural network. The trained language recognition neural network may comprise more than 30 layers (or more than 50 layers or more than 80 layers) and/or less than 500 layers (or less than 300 layers or less than 200 layers). The trained language recognition neural network may be a recurrent neural network, for example, a long short-term memory network. Using a recurrent neural network, for example a long short-term memory network, may provide a language recognition machine-learning algorithm with high accuracy for biology-related language-based data. However, also other language recognition algorithms may be applicable. For example, the trained language recognition machine-learning algorithm may be an algorithm able to handle output data of variable length. For example, a length of first biology-related language-based output data may differ from a length of second biology-related language-based output data. Protein sequences, for example, typically are tens to hundreds of amino acids long (with one amino acid represented as one letter in the protein sequence). The "semantics", e.g. biological function of substrings from the sequence (called polypeptides, motifs or domains in biology) may vary in length. Thus, using an architecture which is capable of providing output of variable length may be used. The decoder of the trained language recognition machine-learning algorithm may be the part of the trained language recognition machine-learning algorithm, which may be used to generate a prediction based on the hidden vector (high-dimensional representation) during training of the language recognition machine-learning algorithm.

The biology-related language-based output data 109 may be a sequence of alphabetic characters (e.g. nucleotide sequence or protein sequence) or a text for which the language recognition machine-learning algorithm was trained. For example, the biology-related language-based output data 109 may be a nucleotide sequence or protein sequence, which was contained by the biologic structure, the image was taken from. Alternatively or additionally, the biology-related language-based output data 109 may be an entry of a vocabulary (e.g. coarse-grained search terms) trained by the trained language recognition machine-learning algorithm.

The system 100 may generate high-dimensional representations for a large number of images. The biology-related image-based input data 109 may be one biology-related image-based data set of a plurality of biology-related image-based data sets stored in a database or generated by a running experiment. For example, the system 100 may obtain a plurality of biology-related image-based data sets and generate an individual high-dimensional representation for every biology-related image-based input data set of the plurality of biology-related image-based data sets by the trained visual recognition machine-learning algorithm. Further, the system 100 may store the individual high-dimensional representations together with the corresponding biology-related image-based input data sets and/or output biology-related language-based output data sets corresponding to the individual high-dimensional representations. In this way, a large number of images may be automatically annotated.

In addition to the generation of annotations for images in the form of the high-dimensional representations, the system 100 may be configured to search for one or more images among the annotated images. For example, the system 100 may receive biology-related language-based search data and generate a high-dimensional representation of the biology-related language-based search data by a trained language recognition machine-learning algorithm. The biology-related language-based search data may be input by a user through an input interface (e.g. keyboard). The biology-related language-based search data may be image data of an image showing content, for which the database should be searched (e.g. to find similar images; image-to-image search), or may be a textual input of a search term (e.g. nucleotide sequence, protein sequence or coarse-grained search term), for which the database should be searched (e.g. to find images corresponding to the search term; text-to-image search). The trained language recognition machine-learning algorithm may be the same language recognition machine-learning algorithm as used for the generation of the biology-related language-based output data, but the encoder of the trained language recognition machine-learning algorithm may be used for generating the high-dimensional representation instead of the decoder.

In addition, the system 100 may compare the high-dimensional representation of the biology-related language-based search data with the individual high-dimensional representations of the plurality of biology-related image-based data sets. The high-dimensional representation of the biology-related language-based search data may be compared to an individual high-dimensional representation of a biology-related image-based data set by calculating a distance between the two high-dimensional representations. The distance (e.g. Euclidean distance or earth mover's distance) between two high-dimensional representations may be calculated with low effort, if the two high-dimensional representations are represented by vectors (e.g. normalized vectors). The calculation of the distance may be repeated for every individual high-dimensional representations of the plurality of biology-related image-based data sets. Based on the calculated distances, the system 100 may select one or more individual high-dimensional representations of the plurality of biology-related image-based data sets based on a selection criterion (e.g. the one or more individual high-dimensional representations with closest distance or within a distance threshold). For example, the system 100 may be configured to select an individual high-dimensional representation of the plurality of biology-related image-based data sets closest to the high-dimensional representation of the biology-related language-based search data based on the comparison. The system 100 may output or store a biology-related image-based data set of the plurality of biology-related image-based data sets based on the comparison. For example, the system 100 may output and/or store the biology-related image-based data set corresponding to the individual high-dimensional representation closest to the high-dimensional representation of the biology-related language-based search data.

As mentioned above, the biology-related image-based input data 107 may be of various types (e.g. images of biological structures comprising nucleotide sequences or protein sequences or biological structures representing a coarse-grained search term of a group of biological terms). A single visual recognition machine-learning algorithm may be trained to handle one type of input only. Therefore, the system 100 may be configured to select the visual language recognition machine-learning algorithm from a plurality of trained visual recognition machine-learning algorithms based on the biology-related image-based input data 107. For example, a plurality of trained visual recognition machine-learning algorithms may be stored by the one or more storage devices 120 and the system 100 may select one of the trained visual recognition machine-learning algorithms depending on the type of input received as biology-related image-based input data 107. For example, the trained visual recognition machine-learning algorithm may be selected from a plurality of trained visual recognition machine-learning algorithms by a classification algorithm (e.g. visual recognition machine-learning algorithm) configured to classify the biology-related image-based input data 107.

The system 100 may determine several annotations for the same image by different trained visual recognition machine-learning algorithms. For example, the system 100 may select the first trained visual recognition machine-learning algorithm for the generation of the first high-dimensional representation from a plurality of trained visual recognition machine-learning algorithms and select a second trained visual recognition machine-learning algorithm from the plurality of trained visual recognition machine-learning algorithms. Further, the system 100 may generate a second high-dimensional representation of the biology-related image-based input data 107 by the second trained visual recognition machine-learning algorithm. The second high-dimensional representation may comprise at least 3 entries each having a different value (or at least 20 entries, at least 50 entries or at least 100 entries having values different from each other). Each trained visual recognition machine-learning algorithm of the plurality of trained visual recognition machine-learning algorithms may be trained on a different type of annotations (e.g. on nucleotide sequences, protein sequences or coarse-grained search terms) and may be able to generate corresponding high-dimensional representations. Additionally, the system 100 may store the second high-dimensional representation of the biology-related image-based input data 107 together with the first high-dimensional representation and the biology-related image-based input data 107 by the one or more storage devices 120 and/or output the first biology-related language-based output data and second biology-related language-based output data corresponding to the second high-dimensional representation. The second biology-related language-based output data may be determined by a second trained language recognition machine-learning algorithm, which was trained on the same type of annotations as the second visual recognition machine-learning algorithm. For example, if the biology-related image-based input data may be image data of an image of a biological structure comprising a nucleotide sequence, the first biology-related language-based output data 109 may be the nucleotide sequence as text (e.g. GATTACA) and the second biology-related language-based output data may be a description of a biological function or a biological activity of the biological structure.

The system 100 may be configured to control an operation of a microscope. For example, the system 100 may control a movement of the microscope to positions of a specimen at which images should be taken to be annotated by the system 100.

More details and aspects of the system 100 are mentioned in conjunction with the proposed concept and/or the one or more examples described above or below (e.g. FIGS. 2-4). The system 100 may comprise one or more additional optional features corresponding to one or more aspects of the proposed concept and/or of one or more examples described above or below.

Figure 2:
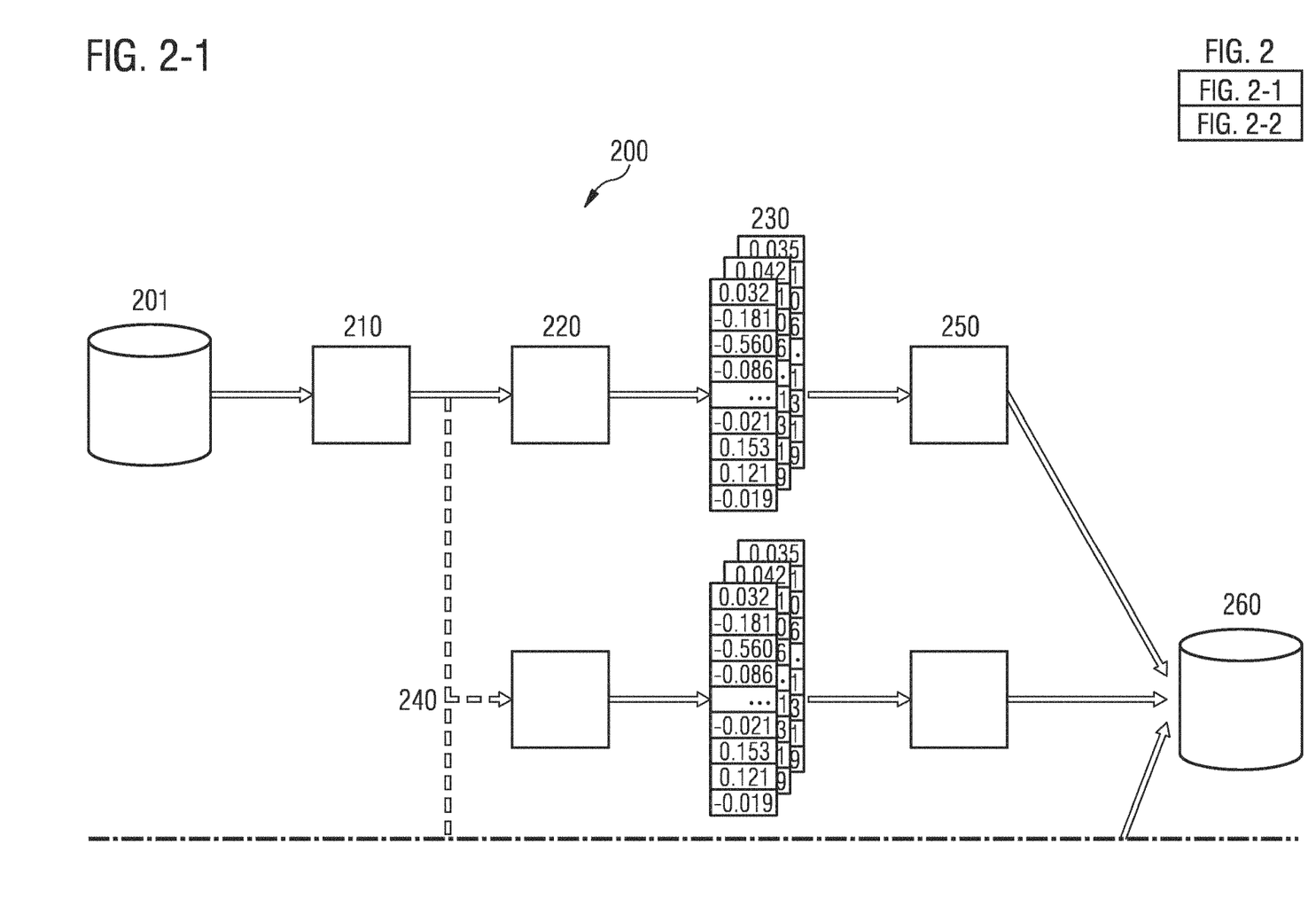
FIG. 2 is a schematic illustration of a system for tagging biology-related image-based input data.
Figure 3:
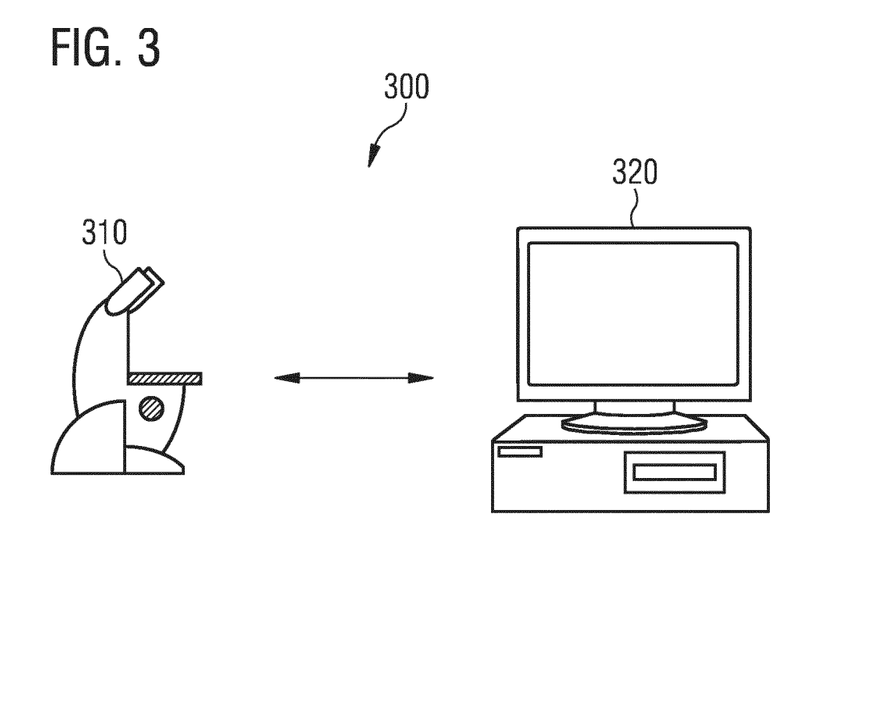
FIG. 3 is a schematic illustration of a system for processing biology-related data including a microscope.

FIG. 2 shows a schematic illustration of a system for tagging biology-related image-based input data according to an embodiment. The system 200 may be implemented similar to the system described in connection with FIG. 1. Images stored in a repository 201 may be passed through a pre-trained visual model 220 (trained visual recognition machine-learning algorithm). There can be any number of such models 240, one for each type of image annotation (or tag). The types of image annotations can be biological sequences, natural language or any of the coarse-grained search terms described above. Hence, there may be a mechanism in place for the selection of the appropriate model(s) 210. This can be a look-up table, a user-provided list or a first pre-trained visual model itself, which recognizes possible content and the available image annotations for it. For example, the first model 210 could recognize if an image contains labeled proteins or a fluorescence in-situ hybridization (e.g. labeled nucleotides) and select functional annotations suitable for either proteins or nucleotide sequences. The semantic embeddings 230 (high-dimensional representations) computed by the pre-trained visual models 220, 240 can then be stored in a database 260, where they can serve for future searches (e.g. Text-to-Image Search and/or Image-to-Image Search). The last database 260) can be (but does not have to be) equivalent to the first repository 200. In order to make the embeddings human-readable they can be converted to text or coarse-grained search terms by the same respective text model 250 that was used to create the embeddings for training a visual model as described below and written to the database 260.

Alternative to writing the annotations to a database, prediction of functional annotations for new classes can be output to the user during a running experiment to provide context for on the spot decision making by the user.

FIG. 2 may show a system for smart tagging for future search queries.

More details and aspects of the system 200 are mentioned in conjunction with the proposed concept and/or the one or more examples described above or below (e.g. FIG. 1 or 3-4). The system 200 may comprise one or more additional optional features corresponding to one or more aspects of the proposed concept and/or of one or more examples described above or below.

The system described in conjunction with one of the FIGS. 1-2 may comprise or may be a computer device (e.g. personal computer, laptop, tablet computer or mobile phone) with the one or more processors and one or more storage devices located in the computer device or the system may be a distributed computing system (e.g. cloud computing system with the one or more processors and one or more storage devices distributed at various locations, for example, at a local client and one or more remote server farms and/or data centers). The system may comprise a data processing system that includes a system bus to couple the various components of the system. The system bus may provide communication links among the various components of the system and may be implemented as a single bus, as a combination of busses, or in any other suitable manner. An electronic assembly may be coupled to the system bus. The electronic assembly may include any circuit or combination of circuits. In one embodiment, the electronic assembly includes a processor which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA) of the microscope or a microscope component (e.g. camera) or any other type of processor or processing circuit. Other types of circuits that may be included in electronic assembly may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The system includes one or more storage devices, which in turn may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The system may also include a display device, one or more speakers, and a keyboard and/or controller, which can include a mouse, trackball, touch screen, voice-recognition device, or any other device that permits a system user to input information into and receive information from the system.

Additionally, the system may comprise a microscope connected to a computer device or a distributed computing system. The microscope may be configured to generate the biology-related image-based input data sets by taking images from one or more specimens.

The microscope may be a light microscope (e.g. diffraction limited or sub-diffraction limit microscope as, for example, a super-resolution microscope or nanoscope). The microscope may be a stand-alone microscope or a microscope system with attached components (e.g. confocal scanners, additional cameras, lasers, climate chambers, automated loading mechanisms, liquid handling systems, optical components attached, like additional multiphoton light paths, optical tweezers and more). Other image sources may be used as well, if they can take images of objects which are related to biological sequences (e.g. proteins, nucleic acids, lipids) or other specimens, for example. For example, a microscope according to an embodiment described above or below may enable deep discovery microscopy.

More details and aspects of the system are mentioned in conjunction with the proposed concept and/or the one or more examples described above or below (e.g. FIGS. 1-4). The system may comprise one or more additional optional features corresponding to one or more aspects of the proposed concept and/or of one or more examples described above or below.

Some embodiments relate to a microscope comprising a system as described in conjunction with one or more of the FIGS. 1-2. Alternatively, a microscope may be part of or connected to a system as described in conjunction with one or more of the FIGS. 1-2. FIG. 3 shows a schematic illustration of a system 300 for processing data according to an embodiment. A microscope 310 configured to take images of one or more biological specimens is connected to a computer device 320 (e.g. personal computer, laptop, tablet computer or mobile phone) configured to process biology-related data. The microscope 310 and the computer device 320 may be implemented as described in conjunction with one or more of the FIGS. 1-2.

Figure 4:
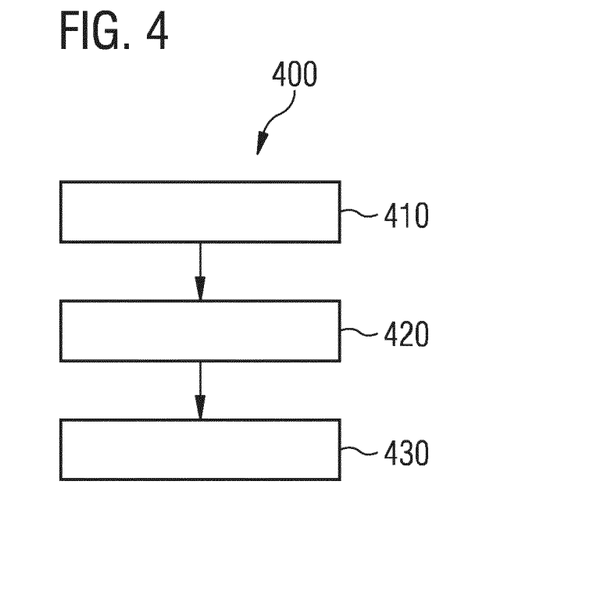
FIG. 4 is a flow chart of a method for processing biology-related image-based input data.

FIG. 4 shows a flow chart of a method for processing biology-related image-based input data according to an embodiment. The method 400 comprises obtaining 410 biology-related image-based input data and generating 420 a high-dimensional representation of the biology-related image-based input data by a trained visual recognition machine-learning algorithm. The high-dimensional representation comprises at least 3 entries each having a different value. Further, the method 400 comprises storing 430 the high-dimensional representation of the biology-related image-based input data together with the biology-related image-based input data and/or outputting 430 biology-related language-based output data corresponding to the high-dimensional representation.

By using a visual recognition machine-learning algorithm images can be mapped to high-dimensional representations. By allowing the high-dimensional representation to have entries with various different values (in contrast to one hot encoded representations), images with semantically similar content can be mapped to similar high-dimensional representations. These high-dimensional representations can be stored or output as annotations or tags of the images and/or these high-dimensional representations may be mapped to textual data, which describes the content of the images. In this way, images in an existing database and/or images of a running experiment may be annotated or tagged, even if the images were not labeled before. If images in a database or of a running experiment are tagged by the corresponding high-dimensional representations, these images may be searchable by a text-to-images search (e.g. a textual search term is input and a corresponding image stored in the database is output) or an image-to-image search (e.g. a search image is input and a similar image stored in the database is output).

More details and aspects of method 400 are mentioned in conjunction with the proposed concept and/or the one or more examples described above or below (e.g. FIGS. 1-3). The method 400 may comprise one or more additional optional features corresponding to one or more aspects of the proposed concept and/or of one or more examples described above or below.

In the following, some examples of applications and/or implementation details for one or more of the embodiments described above (e.g. in conjunction with one or more of the FIGS. 1-4) are described.

According to an aspect, a visual model trained to predict semantic embeddings from images as described above or below may be utilized to automatically annotate ("tag") images in a data repository or generated during a running microscopy experiment. The images then may become searchable by using text queries (e.g. biological sequences, coarse-grained search terms). This may also work on previously unseen classes of objects ("zero-shot learning").

The smart tagging functionality described above and/or below may generate value by making images searchable in a database, which were previously un-annotated. Microscope users may aim to label their data pro-actively, but often it is not known at the time of the experiment, what other data might become relevant for analysis later. Moreover, the fast pace of biological discovery means that new functionality of biomolecules might be discovered in the future, which wasn't known at the time of the experiment. With the smart tagging functionality of the proposed concept, data from older work, data stored in repositories of large work groups, institutions or in public databases can be retrospectively annotated. In this way, faster search queries, more specific filters in search queries, more precise predictions may be enabled by models built using data mining techniques, machine learning and related forms of analysis. The output of such an analysis can be used to make decisions about and changes to the running workflow of the microscope.

Instead of relying on discreet labels (e.g. as in one-hot encoded vectors), the proposed concept may output semantic embeddings, which are latent vectors. Hence, the tags, even when not entirely predicted correctly, may still be usable if they are semantically close to the correct label. Other techniques using one-hot encoded categorical class variables as output would generally make predictions which are either right or wrong and if wrong usually completely off. The latter may be due to the fact that one-hot encoded categorical class variables treat different classes as completely unrelated.

The semantic embeddings created by the proposed concept may serve as a proxy of biological function, which may help to group bodies of data into functional groups, which may be more relevant to the biological researcher then, because they may have been created using language models which have been trained on biological sequences (as described below) or natural language providing a description of biological function.

The smart tagging according to an aspect may be based on the following steps:

1. A pre-trained visual model may recognize the image content of images coming from an imaging device or database and selects a suitable second model. This model selection can be achieved as described above.

2. A second pre-trained visual model may create the respective embeddings of a series of images coming from an imaging device or a database.

3. These semantic embeddings may be written to a database for future searches, such as a text-to-image search or an image-to-image search or other searches.

4. Optionally, the embeddings can be converted back into text, or coarse-grained search terms (as described above) or other human readable formats by a suitable model.

The model for predicting semantic embeddings may be trained as described below, but can be trained in a different way also.

Step 1 may be optional. The images for tagging may be the outcome of an experiment with an (same or other) imaging device. The images for tagging may be received from a database (e.g. manual query or automatic query by imaging or other laboratory device). The images for tagging may be obtained by unsupervised clustering and/or arithmetic combination of image embeddings produced by an imaging device and a model.

The proposed concept may enable generalization, which may refer to the capability of a model to make correct predictions on previously unseen input within the same classes the model was trained on. Zero-shot learning may refer to the capability of a model to make correct predictions on previously unseen input outside the classes it was trained on. The latter may open new capabilities in the domain of biology.

Given an unknown image, which was neither contained in the training set nor even necessarily part of any of the training classes, the proposed concept may be able to predict functional annotations, such as the coarse-grained search terms mentioned above. The information can be output to the user during a running experiment or written to an image database as a functional annotation. The latter may be equivalent to a smart tagging mechanism, which may provide informative annotations for previously non-annotated or non-labeled images.

For example, any experiment leading to large data sets can be annotated automatically along-side with the data recording. The automatic annotations produced by the proposed concept may be combined with meta-data available, such as instrument data, data describing sample preparation, data on conducting the experiment and chemicals used, data from laboratory management and information systems. Large "-omics"-scale screens, drug screens or target validation and toxicology screens may be examples of such experiments.

The proposed concept can also be applied to retrospectively tag existing bodies of data, which are too large or too heterogenic for manual annotation.

For example, knowledge may often be represented in a structured fashion. In the context of biomolecules common categories may be referred to as coarse-grained search terms as mentioned above. They may be usable as query terms and may also be represented as their respective semantic embeddings as obtained from a pre-trained language model (trained in a similar fashion as described below).

A trained language recognition machine-learning algorithm and/or a trained visual recognition machine-learning algorithm may be obtained by a training described in the following. A system for training machine-learning algorithms for processing biology-related data may comprise one or more processors and one or more storage devices. The system may be configured to receive biology-related language-based input training data. Additionally, the system may be configured to generate a first high-dimensional representation of the biology-related language-based input training data by a language recognition machine-learning algorithm executed by the one or more processors. The first high-dimensional representation comprises at least three entries each having a different value. Further, the system may be configured to generate biology-related language-based output training data based on the first high-dimensional representation by the language recognition machine-learning algorithm executed by the one or more processors. In addition, the system may be configured to adjust the language recognition machine-learning algorithm based on a comparison of the biology-related language-based input training data and the biology-related language-based output training data. Additionally, the system may be configured to receive biology-related image-based input training data associated with the biology-related language-based input training data. Further, the system may be configured to generate a second high-dimensional representation of the biology-related image-based input training data by a visual recognition machine-learning algorithm executed by the one or more processors. The second high-dimensional representation comprises at least three entries each having a different value. Further, the system may be configured to adjust the visual recognition machine-learning algorithm based on a comparison of the first high-dimensional representation and the second high-dimensional representation.

The biology-related language-based input training data may be a textual input being related to a biological structure, a biological function, a biological behavior or a biological activity. For example, the biology-related language-based input training data may be a nucleotide sequence, a protein sequence, a description of a biological molecule or biological structure, a description of a behavior of a biological molecule or biological structure, and/or a description of a biological function or a biological activity. The biology-related language-based input training data may be a first biology-related language-based input training data set (e.g. sequence of input characters, for example, a nucleotide sequence or a protein sequence) of a training group. The training group may comprise a plurality of biology-related language-based input training data sets.

The biology-related language-based output training data may be of the same type as the biology-related language-based input training data including optionally a prediction of a next element. For example, the biology-related language-based input training data may be a biological sequence (e.g. a nucleotide sequence or a protein sequence) and the biology-related language-based output training data may be a biological sequence (e.g. a nucleotide sequence or a protein sequence) as well. The language recognition machine-learning algorithm may be trained so that the biology-related language-based output training data is equal to the biology-related language-based input training data including optionally a prediction of a next element of the biological sequence. In another example, the biology-related language-based input training data may be a biological class of a coarse-grained search term and the biology-related language-based output training data may be a biological class of the coarse-grained search term as well.

The biology-related image-based input training data may be image training data (e.g. pixel data of a training image) of an image of a biological structure comprising a nucleotide or a nucleotide sequence, a biological structure comprising a protein or a protein sequence, a biological molecule, a biological tissue, a biological structure with a specific behavior, and/or a biological structure with a specific biological function or a specific biological activity. The biology-related image-based input training data may be a first biology-related image-based input training data set of a training group. The training group may comprise a plurality of biology-related image-based input training data sets.

The biology-related language-based input training data may be a biology-related language-based input training data set (e.g. sequence of input characters, for example, a nucleotide sequence or a protein sequence) of a training group. The training group may comprise a plurality of biology-related language-based input training data sets. The system may repeat generating a first high-dimensional representation for each of a plurality of biology-related language-based input training data sets of a training group. Further, the system may generate biology-related language-based output training data for each generated first high-dimensional representation. The system may adjust the language recognition machine-learning algorithm based on each comparison of biology-related language-based input training data of the plurality of biology-related language-based input training data sets of the training group with the corresponding biology-related language-based output training data. In other words, the system may be configured to repeat generating a first high-dimensional representation, generating biology-related language-based output training data, and adjusting the language recognition machine-learning algorithm for each biology-related language-based input training data of a training group of biology-related language-based input training data sets. The training group may comprise enough biology-related language-based input training data sets so that a training target (e.g. variation of an output of a loss function below a threshold) can be fulfilled.

The plurality of all first high-dimensional representations generated during training of the language recognition machine-learning algorithm may be called latent space or semantic space.

The system may repeat generating a second high-dimensional representation for each of a plurality of biology-related image-based input training data sets of a training group. Further, the system may adjust the visual recognition machine-learning algorithm based on each comparison of a first high-dimensional representation with the corresponding second high-dimensional representation. In other words, the system may repeat generating a second high-dimensional representation and adjusting the visual recognition machine-learning algorithm for each biology-related image-based input training data of a training group of biology-related image-based input training data sets. The training group may comprise enough biology-related image-based input training data sets so that a training target (e.g. variation of an output of a loss function below a threshold) can be fulfilled.

For example, the system 100 uses a combination of a language recognition machine-learning algorithm and a visual recognition machine-learning algorithm (e.g. also called visual-semantic model). The language recognition machine-learning algorithm and/or the visual recognition machine-learning algorithm may be deep learning algorithms and/or artificial intelligence algorithms.

The training may converge fast and/or may provide a well-trained algorithm for biology-related data by using the cross entropy loss function for training the language recognition machine-learning algorithm, although other loss functions could be used as well.

The visual recognition machine-learning algorithm may be trained by adjusting parameters of the visual recognition machine-learning algorithm based on the comparison of a high dimensional representation generated by the language recognition machine-learning algorithm with a high dimensional representation generated by the visual recognition machine-learning algorithm of corresponding input training data. For example, network weights of a visual recognition neural network may be adjusted based on the comparison. The adjustment of the parameters (e.g. network weights) of the visual recognition machine-learning algorithm may be done under consideration of a loss function. For example, the comparison of the first high-dimensional representation and the second high-dimensional representation for the adjustment of the visual recognition machine-learning algorithm may be based on a cosine similarity loss function. The training may converge fast and/or may provide a well-trained algorithm for biology-related data by using the cosine similarity loss function for training the visual recognition machine-learning algorithm, although other loss functions could be used as well.

For example, the visual model may learn how to represent an image in the semantic embedding space (e.g. as a vector). So, a measure for the distance of two vectors may be used, which may represent the prediction A (the second high-dimensional representation) and the ground-truth B (the first high-dimensional representation). For example, a measure is the cosine similarity as defined in $$\text{similarity} = \cos(\theta) = \frac{A \cdot B}{\|A\|\|B\|}$$

with the dot product of the prediction A and ground-truth B divided by the dot product of their respective magnitudes (e.g. as in L2-Norm or Euclidian norm).

More details with respect to non-training specific aspects of the system for training machine-learning algorithms are mentioned in conjunction with the proposed concept and/or the one or more examples described above or below (e.g. FIGS. 1-4).

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm, e.g. a classification algorithm, a regression algorithm or a similarity learning algorithm. Classification algorithms may be used when the outputs are restricted to a limited set of values, i.e. the input is classified to one of the limited set of values. Regression algorithms may be used when the outputs may have any numerical value (within a range). Similarity learning algorithms may be similar to both classification and regression algorithms, but are based on learning from examples using a similarity function that measures how similar or related two objects are. Apart from supervised or semi-supervised learning, unsupervised learning may be used to train the machine-learning model. In unsupervised learning, (only) input data might be supplied, and an unsupervised learning algorithm may be used to find structure in the input data, e.g. by grouping or clustering the input data, finding commonalities in the data. Clustering is the assignment of input data comprising a plurality of input values into subsets (clusters) so that input values within the same cluster are similar according to one or more (predefined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input, but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g. based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data, e.g. in classification or regression analysis. Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier. For example, the computer program may be stored on a non-transitory storage medium. Some embodiments relate to a non-transitory storage medium including machine readable instructions, when executed, to implement a method according to the proposed concept or one or more examples described above.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS 100 system for processing biology-related data
107 biology-related image-based input data
109 biology-related language-based output data
110 one or more processors
120 one or more storage devices
200 system for processing biology-related data
201 repository
210 first model
220 pre-trained visual model
230 semantic embeddings; high-dimensional representations
240 pre-trained visual model; trained visual recognition machine-learning algorithm
250 text model; trained language recognition machine-learning algorithm
260 database
300 system for processing biology-related data
310 microscope
320 computer device
400 method for processing biology-related image-based input data
410 obtaining biology-related image-based input data
420 generating a high-dimensional representation
430 at least one of storing or outputting

The invention claimed is:

1. A system comprising one or more processors, one or more interfaces, and one or more storage devices, wherein the system, using the one or more processors, is configured to:
   obtain biology-related image-based input data via the one or more interfaces;
   select a trained visual recognition machine-learning algorithm from a plurality of trained visual recognition machine-learning algorithms based on the biology-related image-based input data, wherein the trained visual recognition machine-learning algorithm is selected so that the values of more than 5 entries of the high-dimensional representation are larger than 10% of a largest absolute value of the entries of the high-dimensional representation;
   generate a high-dimensional representation of the biology-related image-based input data by the trained visual recognition machine-learning algorithm executed by the one or more processors, wherein the high-dimensional representation comprises at least 3 entries each having a different value; and
   at least one of:
      store the high-dimensional representation of the biology-related image-based input data together with the biology-related image-based input data by the one or more storage devices; or
      output biology-related language-based output data corresponding to the high-dimensional representation.

2. The system of claim 1, wherein the biology-related image-based input data is image data of an image of at least one of a biological structure comprising a nucleotide sequence, a biological structure comprising a protein sequence, a biological molecule, biological tissue, a biological structure with a specific behavior, or a biological structure with a specific biological function or a specific biological activity.

3. The system of claim 1, wherein the values of one or more entries of the high-dimensional representation are proportional to a likelihood of a presence of a specific biological function or a specific biological activity.

4. The system of claim 1, wherein the biology-related language- based output data is at least one of a nucleotide sequence, a protein sequence, a description of a biological molecule or biological structure, a description of a behavior of a biological molecule or biological structure, or a description of a biological function or a biological activity.

5. The system of claim 1, further comprising a microscope configured to obtain the biology-related image-based input data by taking an image of a biological specimen.

6. The system of claim 1, wherein the high-dimensional representation is a numerical representation.

7. The system of claim 1, wherein the high-dimensional representation comprises more than 100 dimensions.

8. The system of claim 1, wherein the high-dimensional representation is a vector.

9. The system of claim 1, wherein the trained visual recognition machine-learning algorithm is selected so that more than 50% of values of the entries of the high-dimensional representation are unequal 0.

10. The system of claim 1, wherein the trained visual recognition machine-learning algorithm comprises a trained visual recognition neural network.

11. The system of claim 10, wherein the trained visual recognition neural network comprises more than 30 layers.

12. The system of claim 10, wherein the trained visual recognition neural network is a convolutional neural network or a capsule network.

13. The system of claim 10, wherein the trained visual recognition neural network comprises a plurality of convolution layers and a plurality of pooling layers.

14. The system of claim 10, wherein the trained visual recognition neural network uses a rectified linear unit activation function.

15. The system of claim 1, wherein the system is further configured to determine, using the one or more processors, the biology-related language-based output data based on the high-dimensional representation by a decoder of a trained language recognition machine-learning algorithm executed by the one or more processors.

16. The system of claim 15, wherein the biology-related language-based output data is an entry of a vocabulary trained by the trained language recognition machine-learning algorithm.

17. The system of claim 1, wherein the system, using the one or more processors further configured to:
obtain a plurality of biology-related image-based data sets via the one or more interfaces, wherein the plurality of biology-related image-based data sets are stored in a database;
generate an individual high-dimensional representation for every biology-related image-based input data set of the plurality of biology-related image-based data sets by the trained visual recognition machine-learning algorithm executed by the one or more processors; and
at least one of:
store the individual high-dimensional representations together with the corresponding biology-related image-based input data sets by the one or more storage devices, or
output biology-related language-based output data sets corresponding to the individual high-dimensional representations.

18. The system of claim 17, wherein the system, using the one or more processors, is further configured to:
receive biology-related language-based search data via the one or more interfaces;
generate a high-dimensional representation of the biology-related language-based search data by a trained language recognition machine-learning algorithm executed by the one or more processors;
compare the high-dimensional representation of the biology-related language-based search data with the individual high-dimensional representations of the plurality of biology-related image-based data sets; and
output a biology-related image-based data set of the plurality of biology-related image-based data sets based on the comparison.

19. The system of one of claim 1, wherein the system, using the one or more processors, is further configured to select the trained visual recognition machine-learning algorithm using a classification algorithm configured to classify the biology-related image-based input data.

20. The system of claim 1, wherein the system, using the one or more processors configured to:
select a second trained visual recognition machine-learning algorithm from the plurality of trained visual recognition machine-learning algorithms;
generate a second high-dimensional representation of the biology-related image-based input data by the second trained visual recognition machine-learning algorithm executed by the one or more processors, wherein the second high-dimensional representation comprises at least 3 entries each having a different value;
at least one of:
store the second high-dimensional representation of the biology-related image-based input data together with the high-dimensional representation and the biology-related image-based input data by the one or more storage devices, or output the biology-related language-based output data and second biology-related language-based output data corresponding to the second high-dimensional representation.

21. The system of claim 1, wherein the system is configured to control an operation of a microscope.

22. A microscope comprising a system of claim 1.

23. A method for processing biology-related image-based input data, the method comprising:
obtaining biology-related image-based input data;
selecting a trained visual recognition machine-learning algorithm from a plurality of trained visual recognition machine-learning algorithms based on the biology-related image-based input data, wherein the trained visual recognition machine-learning algorithm is selected so that the values of more than 5 entries of the high-dimensional representation are larger than 10% of a largest absolute value of the entries of the high-dimensional representation;
generating a high-dimensional representation of the biology-related image-based input data by the trained visual recognition machine-learning algorithm, wherein the high-dimensional representation comprises at least 3 entries each having a different value; and at least one of:
  storing the high-dimensional representation of the biology-related image-based input data together with the biology-related image-based input data, or outputting biology-related language-based output data corresponding to the high-dimensional representation.

24. A non-transitory, computer readable medium having a program code for performing a method according to claim 23 when the program is executed by processor.

* * * * *